United States Patent
Takada et al.

[11] Patent Number: 6,066,846
[45] Date of Patent: May 23, 2000

[54] LIGHT BEAM SCANNING APPARATUS

[75] Inventors: Norihisa Takada, London, United Kingdom; Masami Okamoto, Hasuda, Japan

[73] Assignees: Fuji Photo Film Co., Ltd., Kanagawa-Ken; Fuji Photo Optical Co., Ltd., Saitama-Ken, both of Japan

[21] Appl. No.: 09/138,671

[22] Filed: Aug. 24, 1998

[30] Foreign Application Priority Data

Aug. 25, 1997 [JP] Japan ..................... 9-228607

[51] Int. Cl.$^7$ .................. H01J 3/14; G02B 26/10
[52] U.S. Cl. ............ 250/236; 250/237 G; 250/235
[58] Field of Search .................. 250/234, 235, 250/236, 231.13, 231.18, 237 R, 237 G; 359/204, 205

[56] References Cited

U.S. PATENT DOCUMENTS

| | | | |
|---|---|---|---|
| 4,853,535 | 8/1989 | Suganuma | 250/235 |
| 5,072,114 | 12/1991 | Takada | 250/235 |
| 5,200,849 | 4/1993 | Iangaki et al. | 250/235 |
| 5,247,173 | 9/1993 | Benchetrit et al. | 250/236 |
| 5,347,124 | 9/1994 | Narukawa et al. | 250/235 |
| 5,371,608 | 12/1994 | Muto et al. | 250/236 |
| 5,587,825 | 12/1996 | Iizuka | 250/236 |

FOREIGN PATENT DOCUMENTS 3-20314  2/1991  Japan .

*Primary Examiner*—John R. Lee
*Attorney, Agent, or Firm*—Sughrue, Mion, Zinn, Macpeak & Seas, PLLC

[57] ABSTRACT

A synchronizing light beam applied to a reference grating passes through the reference grating as a pulsed synchronizing light beam, which is converged by a convex entrance surface of a light guide rod onto a rear surface thereof. The synchronizing light beam is then diffused and reflected by a diffusion surface on the rear surface, and applied to photodiodes on respective opposite ends of the light guide rod. The photodiodes converts the applied light to a synchronizing signal.

9 Claims, 4 Drawing Sheets

LIGHT BEAM SCANNING APPARATUS

BACKGROUND OF THE INVENTION

1. Field of the Invention

The present invention relates to a light beam scanning apparatus for recording or reading an image or other information with a light beam according to a synchronizing signal which is generated from a synchronizing light beam.

2. Description of the Related Art

There have been proposed various apparatus for scanning a medium with a laser beam to record an image or the like on or read an image or the like from the medium. For recording an image or the like on a medium highly accurately, it is necessary to turn on and off a laser beam accurately at the position where the medium is scanned by the laser beam.

One known mechanism for generating a synchronizing signal to control the times to turn on and off a laser beam is illustrated in FIG. 8 of the accompanying drawings. According to the illustrated mechanism, a scanning laser beam for scanning a medium is guided by a scanning optical system, and a synchronizing laser beam S is also guided by the same scanning optical system toward a reference grating 2. When the synchronizing laser beam S passes through the reference grating 2, it is converted to a pulsed synchronizing laser beam S which is introduced into a cylindrical light guide rod 4. The pulsed synchronizing laser beam S enters from an entrance side of the cylindrical light guide rod 4 and is diffused by a diffusion surface that faces the entrance side of the cylindrical light guide rod 4. The diffused light is reflected by an inner surface of the cylindrical light guide rod 4 toward a pair of photodiodes 6a, 6b mounted respectively on opposite ends of the cylindrical light guide rod 4. In response to the applied diffused light, the photodiodes 6a, 6b generate a synchronizing signal.

While the light guide rod 4 is cylindrical in shape, each of the photodiodes 6a, 6b is normally of a square shape. As a result, a light loss is caused where the photodiodes 6a, 6b are joined to the cylindrical light guide rod 4 due to different shapes of the cylindrical light guide rod 4 and the square photodiodes 6a, 6b. Furthermore, the light energy suffers an appreciable loss because of the reflection by the inner surface of the cylindrical light guide rod 4.

As shown in FIGS. 9 and 10 of the accompanying drawings, one solution has been to use a prismatic light guide rod 8 whose transverse cross-sectional shape is progressively greater or smaller in the longitudinal direction. A photodiode 10 is mounted on a longitudinal end of the prismatic light guide rod 8 which has a larger cross-sectional shape. For details, reference should be made to Japanese laid-open utility model publication No. 3-20314.

As shown in FIGS. 9 and 10, a synchronizing laser beam S introduced through a reference grating 2 into the light guide rod 8 from an entrance side thereof is diffused by a diffusion surface 14 which faces the entrance side. The diffused light is then reflected by an inner surface of the light guide rod 8 progressively toward the end of the larger cross-sectional shape, where the light is applied to the photodiode 10, which then generates a synchronizing signal. With the arrangement shown in FIGS. 9 and 10, the shape of the end of the light guide rod 8 and the shape of the photodiode 10 can be brought into conformity with each other, and any light energy loss owing to the reflection by the inner surface of the light guide rod 8 is held to a minimum. Therefore, it is possible for the light guide rod 8 to guide the synchronizing laser beam S efficiently.

However, if the temperature of the scanning apparatus varies or the scanning optical system suffers a positional displacement, then the synchronizing laser beam S may possibly be applied to the reference grating 2 at a displaced position. For example, as shown in FIG. 10, when the synchronizing laser beam S is displaced from a normal position indicated by the solid line to a position indicated by the dotted line S', the synchronizing laser beam S fails to fall on the diffusion surface 14, and mostly passes through the light guide rod 8. Consequently, the amount of light that reaches the photodiode 10 is greatly reduced, making the photodiode 10 unable to generate an accurate synchronizing signal. Increasing the width of the diffusion surface 14 would not solve the above problem, but rather would result in an increased energy loss because the synchronizing laser beam S diffused by the diffusion surface 14 is reflected by the inner surface of the light guide rod 8 and applied at an increased rate back to the diffusion surface 14 before reaching the photodiode 10 on the end of the light guide rod 8.

SUMMARY OF THE INVENTION

It is a principal object of the present invention to provide a light beam scanning apparatus which is capable of generating a highly accurate synchronizing signal without being adversely affected by a positional change of a synchronizing light beam due to temperature variations, vibrations, a positional displacement of an optical element, etc.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
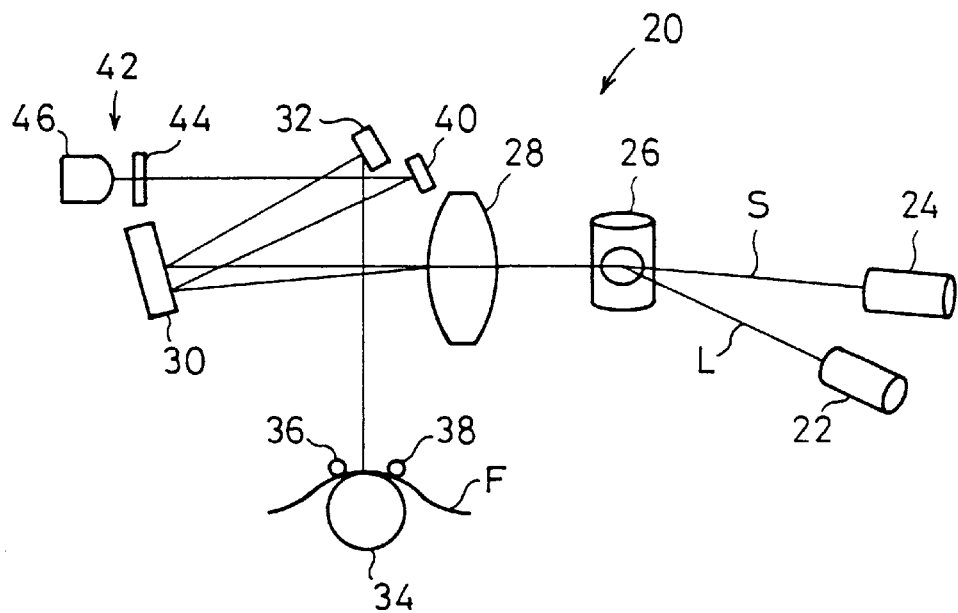
FIG. 1 is a schematic view of a light beam scanning apparatus according to an embodiment of the present invention.

As shown in FIG. 1, a light beam scanning apparatus 20 according to an embodiment of the present invention has a recording light source 22 for emitting a recording laser beam L that is turned on and off, i.e., modulated, depending on image information to be recorded, and a synchronizing light source 24 for emitting a synchronizing laser beam S for generating a synchronizing signal with respect to a scanning position of the recording laser beam L.

The recording laser beam L is guided to a photosensitive film F via a light deflector 26 which deflects the recording laser beam L in a main scanning direction, an fθ lens (scanning lens) 28 which adjusts a scanning speed of the deflected recording laser beam L, and reflecting mirrors 30, 32. The photosensitive film F is delivered in an auxiliary scanning direction perpendicular to the main scanning direction while sandwiched between an exposure drum 34 and a pair of nip rollers 36, 38.

Figure 2:
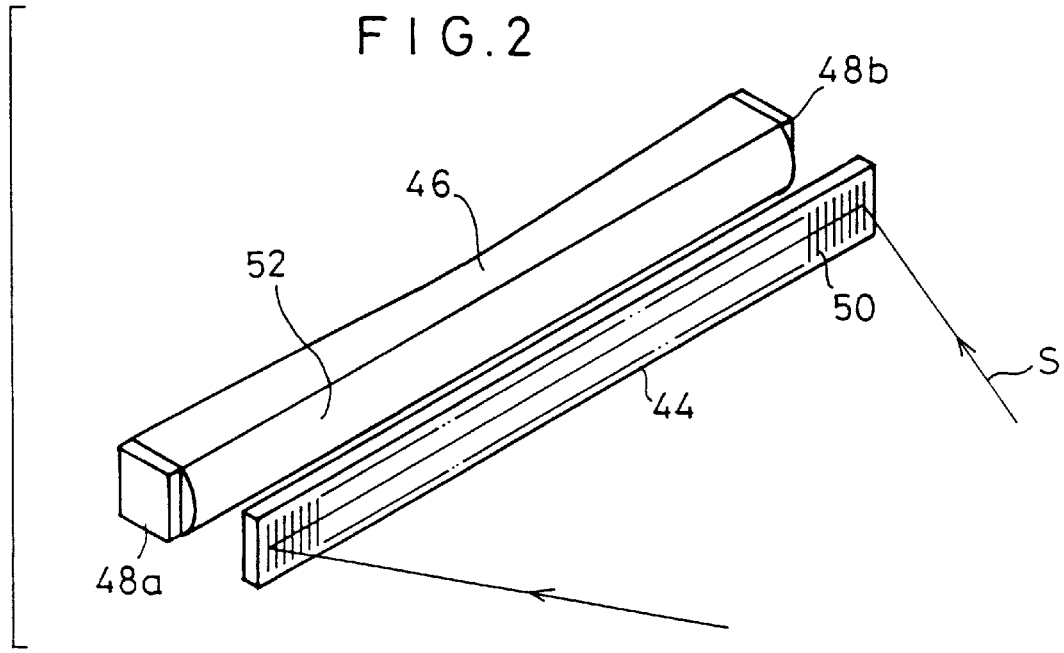
FIG. 2 is a perspective view of a synchronizing signal generator of the light beam scanning apparatus shown in FIG. 1.

The synchronizing laser beam S is guided to a synchronizing signal generator 42 via the light deflector 26, the fθ lens 28, the reflecting mirror 30, and a reflecting mirror 40. As shown in FIG. 2, the synchronizing signal generator 42 comprises a reference grating 44 which is elongate along the main scanning direction, an elongate light guide rod 46 extending parallel to and disposed behind the reference grating 44, and a pair of photodiodes 48a, 48b mounted as photoelectric transducers on opposite ends, respectively, of the light guide rod 46. Each of the photodiodes 48a, 48b is of a square shape.

The reference grating 44 has an array of slits 50 defined at given intervals in the longitudinal direction thereof. The synchronizing laser beam S applied to the reference grating 44 passes through the slits 50 as a pulsed synchronizing laser beam S into the light guide rod 46.

Figure 3A:
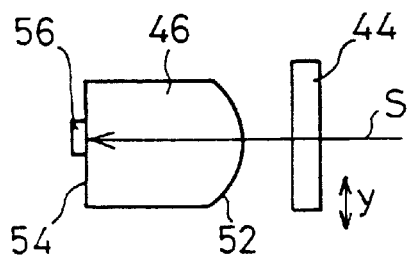
FIG. 3A is a transverse cross-sectional view of the synchronizing signal generator, showing the manner in which a synchronizing laser beam is applied to the synchronizing signal generator at a normal position.
Figure 3B:
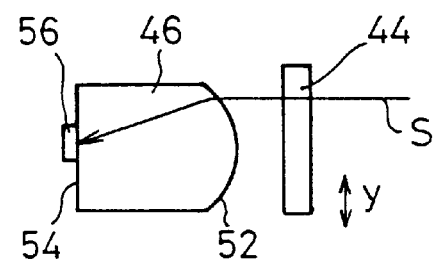
FIG. 3B is a transverse cross-sectional view of the synchronizing signal generator, showing the manner in which a synchronizing laser beam is applied to the synchronizing signal generator at a displaced position.

The light guide rod 46 has a partly cylindrical, convex entrance surface 52 facing the reference grating 44, and a substantially planar rear surface 54 (see FIGS. 3A and 3B) confronting the entrance surface 52 and spaced progressively away from the entrance surface 52 in directions from the longitudinal center of the light guide rod 46 toward opposite ends thereof. As shown in FIGS. 3A and 3B, a diffusion surface 56 in the form of a white coating or the like is disposed on the rear surface 54 and extends longitudinally along the rear surface 54. The light guide rod 46 has a substantially square-shaped cross section, so that the photodiodes 48a, 48b can be substantially coextensive with the opposite ends of the light guide rod 46.

The light beam scanning apparatus 20 shown in FIGS. 1, 2, 3A, and 3B operates and offers advantages as follows:

The synchronizing laser beam S emitted from the synchronizing light source 24 is deflected by the light deflector 26, and thereafter adjusted for its scanning speed by the fθ lens 28. Then, the synchronizing laser beam S is reflected by the reflecting mirrors 30, 40 to the synchronizing signal generator 42.

The synchronizing laser beam S applied to the synchronizing signal generator 42 passes through the slits 50 of the reference grating 44 as a pulsed synchronizing laser beam S, which is converged by the partly cylindrical, convex entrance surface 52 and directed to the flat rear surface 54.

Then, the synchronizing laser beam S is diffused and reflected by the diffusion surface 56 on the flat rear surface 54, and repeatedly reflected in the light guide rod 46 until finally it reaches the photodiodes 48a, 48b, which convert the synchronizing laser beam S into an electric synchronizing signal.

The recording laser beam L emitted from the recording light source 22 is turned on and off by the synchronizing signal, and passes through the light deflector 26 and the fθ lens 28. Thereafter, the recording laser beam L is reflected by the reflecting mirrors 30, 32 to the photosensitive film F. At this time, since the photosensitive film F is being delivered in the auxiliary scanning direction by exposure drum 34 and the rollers 36, 38, an image is two-dimensionally recorded on the photosensitive film F as it is scanned in the main scanning direction by the recording laser beam L.

While the image is being recorded on the photosensitive film F, if the ambient temperature around the light beam scanning apparatus 20 varies or the reflecting mirrors 30, 40 or other optical elements of the scanning optical system are positionally displaced due to vibrations or the like, the synchronizing laser beam S is positionally displaced with respect to the synchronizing signal generator 42.

However, since the entrance surface 52 of the light guide rod 46 is convex in shape, the synchronizing laser beam S applied thereto is converged onto the diffusion surface 54 irrespective of the position where the synchronizing laser beam S falls on the entrance surface 52, as shown in FIG. 3B.

Figure 4:
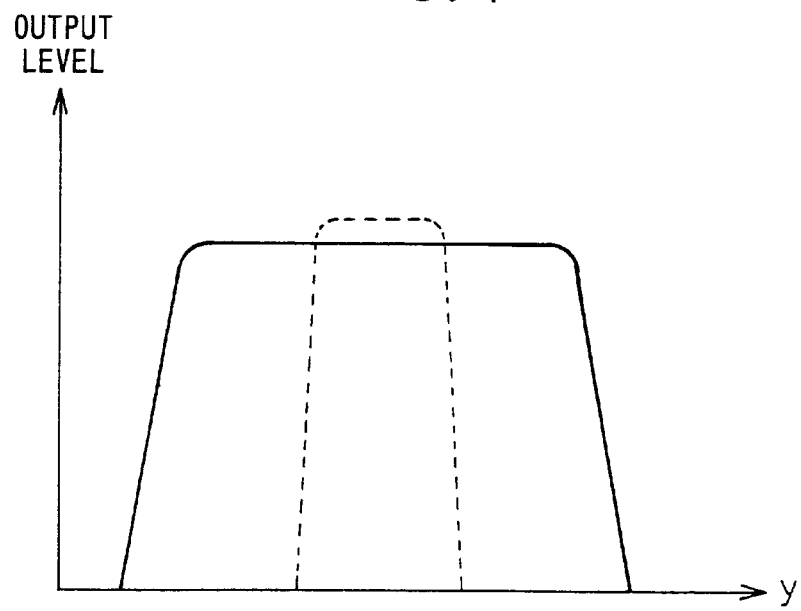
FIG. 4 is a diagram showing for comparison synchronizing signal output levels of a conventional light guide rod and a light guide rod according to the embodiment of the present invention.
Figure 9:
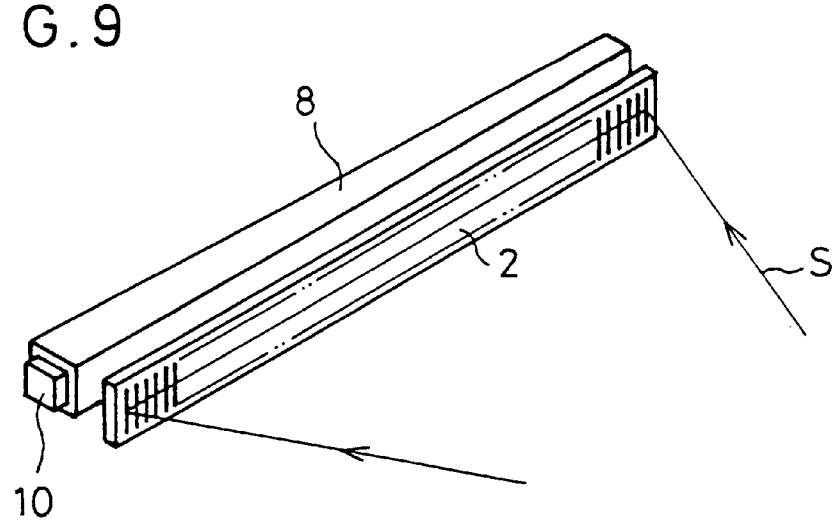
FIG. 9 is a perspective view of another conventional synchronizing signal generator.
Figure 10:
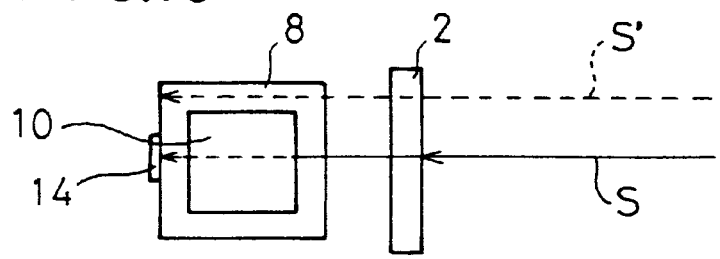
FIG. 10 is a side elevational view of the conventional synchronizing signal generator shown in FIG. 9, showing the manner in which a synchronizing laser beam is applied to a light guide rod at a displaced position.

FIG. 4 shows for comparison the synchronizing signal output level (indicated by the dotted line) of the conventional light guide rod 8 shown in FIG. 9 and the synchronizing signal output level (indicated by the solid line) of the light guide rod 46 shown in FIG. 2, as a function of the position in a y-axis direction perpendicular to the longitudinal direction of the reference grating. A review of FIG. 4 indicates that the light guide rod 46 can produce a synchronizing signal output level which is constant in a wider range in the y-axis direction perpendicular to the longitudinal direction of the reference grating 44 than possible with the conventional light guide rod 8 shown in FIG. 9.

Figure 5:
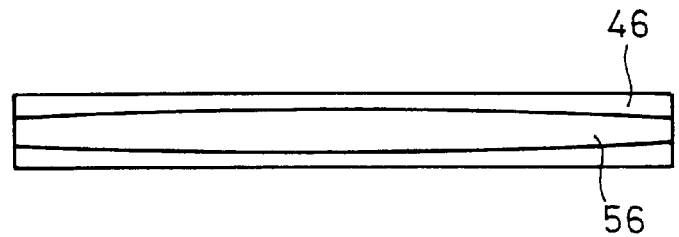
FIG. 5 is a front elevational view of a diffusion surface on the light guide rod according to the embodiment of the present invention.

As shown in FIG. 5, the diffusion surface 56 has a width which is progressively greater toward the longitudinal center of the light guide rod 46 where the rear surface 54 is closer to the entrance surface 52, and progressively smaller toward the opposite ends of the light guide rod 46 where the rear surface 54 is remoter from the entrance surface 52. The diffusion surface 56 thus shaped allows the synchronizing laser beam S to be guided to the diffusion surface 56 efficiently depending on the position in which the synchronizing laser beam S is introduced into the light guide rod 46. Accordingly, the synchronizing laser beam S can be applied efficiently to the photodiodes 48a, 48b on the opposite ends of the light guide rod 46.

Figure 6:
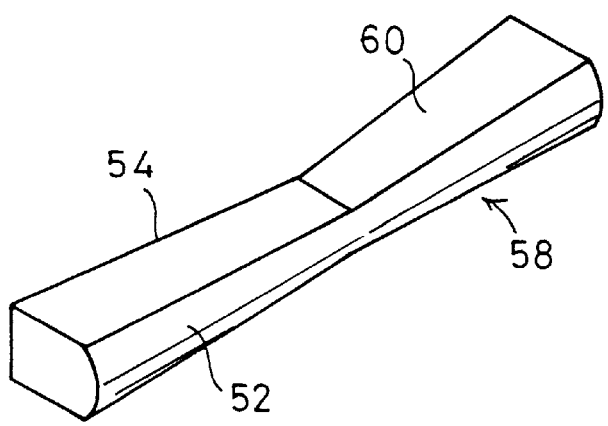
FIG. 6 is a perspective view of a light guide rod according to another embodiment of the present invention.

FIG. 6 shows a light guide rod according to another embodiment of the present invention. In FIG. 6, a rear surface 54 of an elongate light guide rod 58 is inclined such that it is spaced progressively away from an entrance surface 52 in directions from the longitudinal center of the light guide rod 58 toward opposite ends thereof. In addition, the light guide rod 58 has an upper surface 60 extending along a scanning plane in which the synchronizing laser beam S scans the reference grating, the upper surface 60 being spaced progressively away from a lower surface of the light guide rod 58 in the directions from the longitudinal center of the light guide rod 58 toward the opposite ends thereof. The light guide rod 58 is more effective to apply the synchronizing laser beam S efficiently to photodiodes on the opposite ends of the light guide rod 58. The lower surface light guide rod 58 may also be inclined in the same manner as with the upper surface 60.

Figure 7:
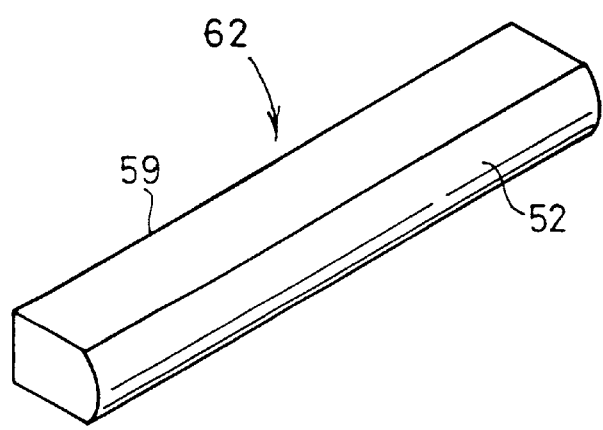
FIG. 7 is a perspective view of a light guide rod according to still another embodiment of the present invention.
Figure 8:
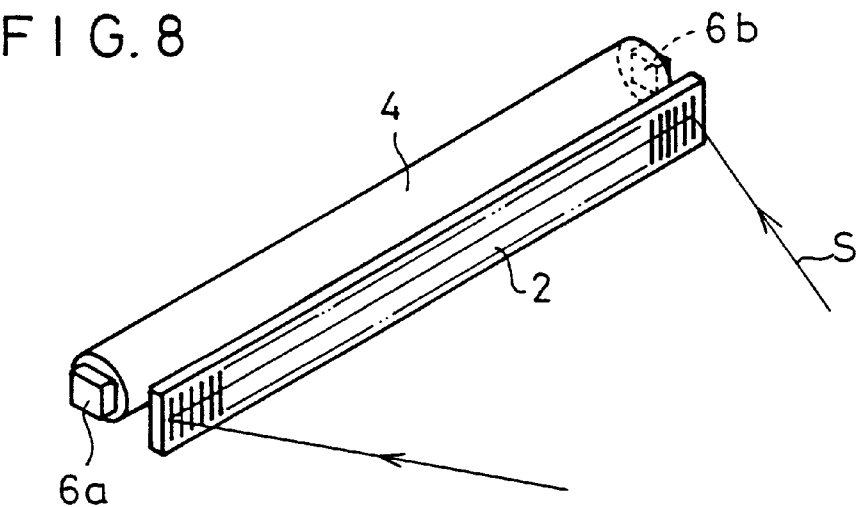
FIG. 8 is a perspective view of a conventional synchronizing signal generator.

According to still another embodiment of the present invention, a light guide rod 62 shown in FIG. 7 is substantially in the form of an elongate prism having a partly cylindrical, convex entrance surface 52, a flat rear surface 59 facing the entrance surface 52, and flat upper and lower surfaces. The light guide rod 62 is suitable for use in situations where the amount of light of the synchronizing laser beam S can be increased.

In the illustrated embodiments, the present invention has been described as being applied to the light beam scanning apparatus 20 which records images or the like according to a synchronizing signal. However, the principles of the present invention are also applicable to a light beam scanning apparatus which reads images or the like according to the synchronizing signal generated by the synchronizing signal generator 42.

Although certain preferred embodiments of the present invention have been shown and described in detail, it should be understood that various changes and modifications may be made therein without departing from the scope of the appended claims.

What is claimed is:

1. A light beam scanning apparatus comprising:

a medium to be scanned;

a reference grating;

an elongate light guide rod extending along said reference grating and supporting a pair of photoelectric transducers mounted respectively on opposite ends thereof; and a scanning optical system for guiding a synchronizing light beam to said reference grating to produce a pulsed synchronizing light beam which is introduced into and travels through said elongate light guide rod to said photoelectric transducers for thereby generating a synchronizing signal, and also for guiding a scanning light beam to said medium to record image information on or read image information from said medium according to said synchronizing signal;

said elongate light guide rod having a convex entrance surface for introducing said pulsed synchronizing light beam therethrough into the elongate light guide rod, a substantially planar rear surface confronting said entrance surface for receiving the introduced pulsed synchronizing light beam, and a diffusion surface disposed on said rear surface and extending longitudinally of said elongate light guide rod, for diffusing the pulsed synchronizing light beam applied to said rear surface.

2. A light beam scanning apparatus according to claim 1, wherein said rear surface is inclined so as to be spaced progressively away from said entrance surface in directions from a longitudinal center of said elongate light guide rod toward the opposite ends thereof.

3. A light beam scanning apparatus according to claim 2, wherein said diffusion surface has a width which is progressively smaller from the longitudinal center of said elongate light guide rod toward the opposite ends thereof.

4. A light beam scanning apparatus according to claim 1, wherein said rear surface is inclined so as to be spaced progressively away from said entrance surface in directions from a longitudinal center of said elongate light guide rod toward the opposite ends thereof, said elongate light guide rod having a surface extending along a scanning plane in which said synchronizing laser beam scans said reference grating, and spaced progressively away from a surface opposite thereto of said elongate light guide rod in the directions from the longitudinal center of said elongate light guide rod toward the opposite ends thereof.

5. A light beam scanning apparatus according to claim 4, wherein said diffusion surface has a width which is progressively smaller from the longitudinal center of said elongate light guide rod toward the opposite ends thereof.

6. A light beam scanning apparatus according to claim 1, wherein said rear surface comprises a flat rear surface extending longitudinally of said elongate light guide rod.

7. A light beam scanning apparatus according to claim 1, wherein said photoelectric transducers are of a square shape and substantially coextensive with the opposite ends of said elongate light guide rod.

8. A light beam scanning apparatus according to claim 7, wherein said photoelectric transducers comprise photodiodes, respectively.

9. A light beam scanning apparatus according to claim 1, wherein said synchronizing light beam comprises a laser beam.

* * * * *